United States Patent
Hu et al.

(10) Patent No.: US 10,920,791 B2
(45) Date of Patent: Feb. 16, 2021

(54) NOISE MITIGATING COMPRESSOR

(71) Applicant: Ford Global Technologies, LLC, Dearborn, MI (US)

(72) Inventors: Liangjun Hu, Bloomfield Hills, MI (US); Ben Zhao, Dearborn, MI (US); Jianwen James Yi, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 16/151,140

(22) Filed: Oct. 3, 2018

(65) Prior Publication Data

US 2020/0109721 A1 Apr. 9, 2020

(51) Int. Cl.
| | |
|---|---|
| *F04D 29/66* | (2006.01) |
| *F01N 13/00* | (2010.01) |
| *F01N 1/08* | (2006.01) |
| *F02B 39/16* | (2006.01) |
| *F02B 33/40* | (2006.01) |

(52) U.S. Cl.
CPC .......... *F04D 29/663* (2013.01); *F01N 1/083* (2013.01); *F01N 13/007* (2013.01); *F02B 39/16* (2013.01); *F02B 33/40* (2013.01); *F02M 2700/331* (2013.01); *F05B 2260/964* (2013.01); *F05D 2220/40* (2013.01); *F05D 2260/96* (2013.01)

(58) Field of Classification Search
CPC ...... F04D 29/663; F01N 1/083; F01N 13/007; F02B 39/16; F02B 33/40; F02M 2700/331; F05B 2260/964; F05D 2220/40; F05D 2260/96

See application file for complete search history.

(56) References Cited

U.S. PATENT DOCUMENTS

| | | | | |
|---|---|---|---|---|
| 2,103,810 A | * | 12/1937 | Caspar | F01N 1/003 181/273 |
| 3,002,341 A | | 10/1961 | Muzzy et al. | |
| 3,196,977 A | * | 7/1965 | Sanders | F01N 1/10 181/256 |
| 5,266,755 A | * | 11/1993 | Chien | F01N 1/089 181/240 |
| 6,623,239 B2 | * | 9/2003 | Sahay | F02B 37/16 415/11 |
| 8,601,713 B2 | * | 12/2013 | Gaillard | A45D 20/12 34/97 |
| 9,951,793 B2 | | 4/2018 | Lucas | |
| 10,520,187 B2 | * | 12/2019 | Orawannukul | F23D 14/70 |

(Continued)

FOREIGN PATENT DOCUMENTS

| | | |
|---|---|---|
| CN | 108019380 A | 5/2018 |
| EP | 2775131 A1 | 9/2014 |

*Primary Examiner* — Aaron R Eastman
(74) *Attorney, Agent, or Firm* — Geoffrey Brumbaugh McCoy Russell LLP

(57) ABSTRACT

Methods and systems are provided for a noise mitigating device for a turbocharger compressor. In one example, the noise mitigating device includes a set of perforated rings arranged in a recirculation passage of a compressor casing treatment. The rings of the set of perforated rings may be oriented so that apertures of one ring are offset from apertures of one or more adjacent rings, forcing air to flow through the apertures via a non-linear path while deflecting at least a portion of sounds waves generated in the compressor.

20 Claims, 5 Drawing Sheets

(56) References Cited

U.S. PATENT DOCUMENTS

| | | | |
|---|---|---|---|
| 2001/0042368 A1* | 11/2001 | Negulescu | F02C 9/18 |
| | | | 60/785 |
| 2007/0271921 A1 | 11/2007 | Chen | |
| 2010/0043447 A1* | 2/2010 | Kirby | F01D 17/105 |
| | | | 60/785 |
| 2010/0115963 A1* | 5/2010 | Kirby | F02C 7/24 |
| | | | 60/785 |
| 2013/0020147 A1* | 1/2013 | Von Inten | F01N 1/10 |
| | | | 181/264 |
| 2014/0251719 A1* | 9/2014 | Feld | F02C 7/045 |
| | | | 181/229 |
| 2016/0258447 A1 | 9/2016 | Day et al. | |
| 2019/0113044 A1* | 4/2019 | Diehl | F04D 29/4206 |

\* cited by examiner

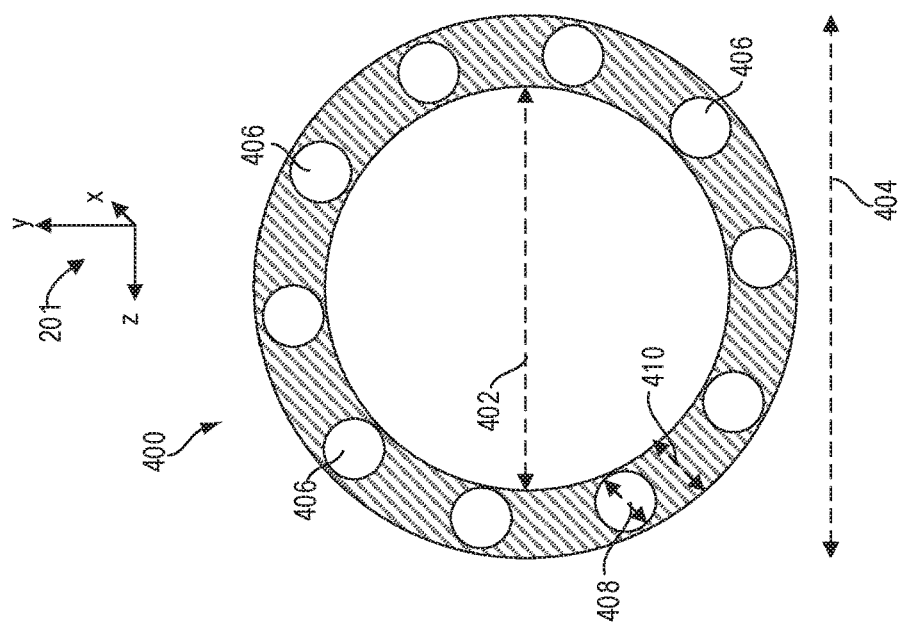
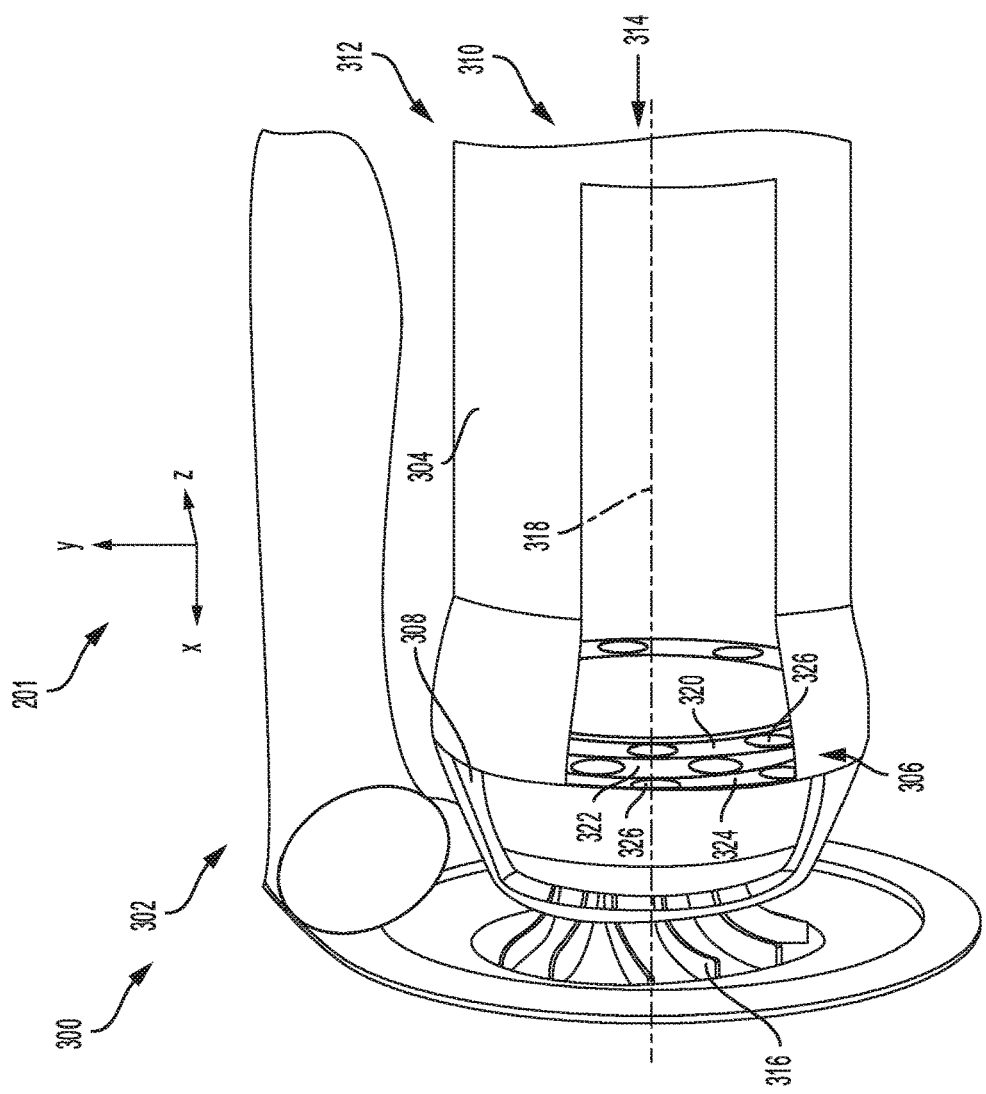

NOISE MITIGATING COMPRESSOR

FIELD

The present description relates generally to a turbocharger compressor and controlling noise generated in the compressor.

BACKGROUND/SUMMARY

An engine may be adapted with a turbocharger to increase engine torque or power output density. The turbocharger may include an exhaust driven turbine mechanically coupled to a compressor and configured to convert kinetic energy derived from exhaust gases to rotation of the compressor. The compressor may be fluidly coupled to an intake manifold of the engine and rotation of the compressor may compress intake air delivered to the intake manifold. The compressed air, with a higher density than ambient air, may be balanced by injection of additional fuel at the combustion chambers of the engine, thereby producing more power per engine stroke than uncompressed air.

The turbocharger compressor may be adapted with a ported shroud, or casing treatment, to widen a flow range through which compressor operation remains stable. By widening the flow range, an efficiency of the compressor may be increased. In particular, the compressor may be adapted with a ported shroud, or casing treatment, to extend a low end flow range to reduce a likelihood of compressor surge when engine speeds are low. The casing treatment may provide an additional pathway for air flow through the compressor, allowing recirculation of air from an outlet to an inlet of the compressor and increasing mass flow into the compressor. Additionally or alternatively, the casing treatment may be adapted to circumvent compressor choke when engine speeds are high by channeling additional air to an outlet of the compressor. However, adapting the compressor with the casing treatment may allow noise generated by the compressor, such as blade pass frequency noise, to be transmitted and amplified through the casing treatment. Such noise may be disruptive to a driver and passengers of a turbocharged vehicle.

Attempts to address noise mitigation in a turbocharger compressor includes installing noise-suppressing devices in the compressor. One example approach is shown by Sahay et al. in U.S. Pat. No. 6,623,239. Therein, an inner deflector is attached to a first portion of an inlet of a compressor with a ported shroud. The inner deflector is annular with a J-shaped or L-shaped cross-section. A first surface of the inner deflector is parallel to a direction of air flow and couples to a wall of a bypass port of the compressor. A second surface of the inner deflector is perpendicular to the first surface and inhibits flow of noise through the bypass passage of the ported shroud. The inner deflector has a third surface that is parallel to the first surface, the third surface configured to dampen sound wave intensity. A combination of all three surfaces may provide noise reduction, accounting for various factors such as frequency, reflection, resonance, and wave cancellation.

However, the inventors herein have recognized potential issues with such systems. As one example, a sound-suppressing capacity of the inner deflector may be offset by flow restriction through the bypass passage imposed by the extension of the second surface into the flow path of the ported shroud. The device may rely on an extent to which the second surface of the inner deflector protrudes into the bypass passage to disrupt sound wave propagation. Increasing the protrusion of the second surface may enhance noise attenuation but also increase restriction of air flow through the bypass passage and decrease compressor efficiency. Thus in order to maintain flow through the bypass passage at a desired rate, the inner device may not sufficiently reduce noise produced in the compressor bypass passage. That is to say, the noise-suppressing device of Sahay may be limited to certain compressor geometries, thereby limiting an application of the noise-suppressing device In one example, the issues described above may be addressed by a noise mitigating device comprising a plurality of perforated rings cascaded along a recirculation passage arranged outside of an intake passage within a compressor housing. In this way, the set of perforated rings may simultaneously pose minimal restriction on air flow through the bypass passage and dampen compressor noise.

As one example, the set of perforated rings may be positioned within the bypass passage, oriented perpendicular to a direction of air flow. The rings of the set of perforated rings may be arranged as layers along the flow path and spaced apart. The layers of rings may be positioned so that perforations of one ring are offset from perforations from one or more adjacent rings cascaded along the bypass passage. As air flows through the bypass passage, the flow may follow a tortuous path through the staggered apertures while sound waves, unable to deviate from a linear path of travel, may be deflected, which may result in destructive interference. By adapting the bypass passage with the set of perforated rings, noise generated from air flow through the bypass passage may be efficiently suppressed without disrupting flow rates therethrough.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 shows a second embodiment of a turbocharger compressor configured with a set of perforated rings.

FIG. 4 shows an example of a ring of the set of perforated rings.

FIGS. 2-5 and 7 are shown approximately to scale.

DETAILED DESCRIPTION

Figure 1:
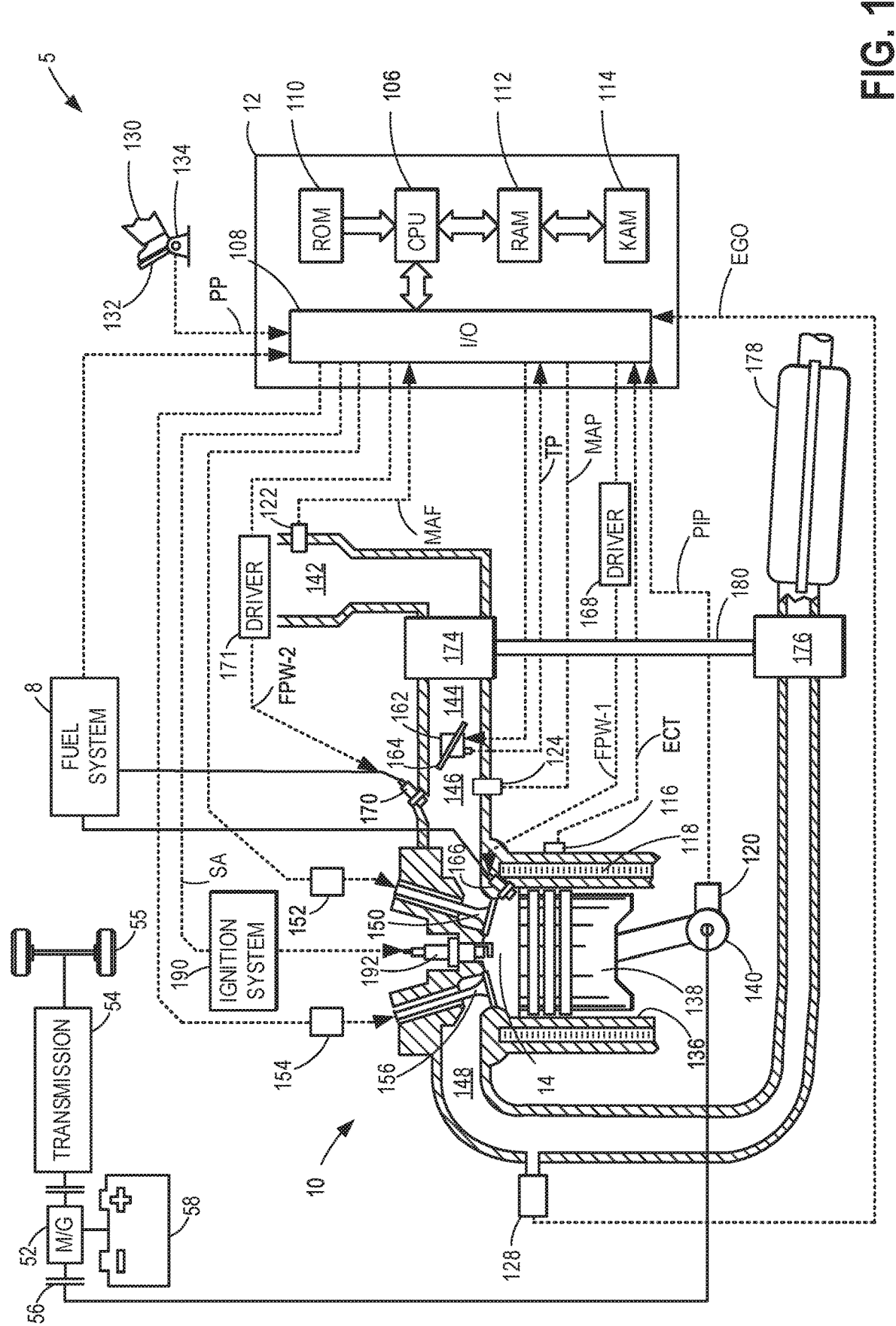
FIG. 1 shows an example of a turbocharged engine that may include a casing treatment in a turbocharger compressor of a hybrid vehicle.
Figure 2:
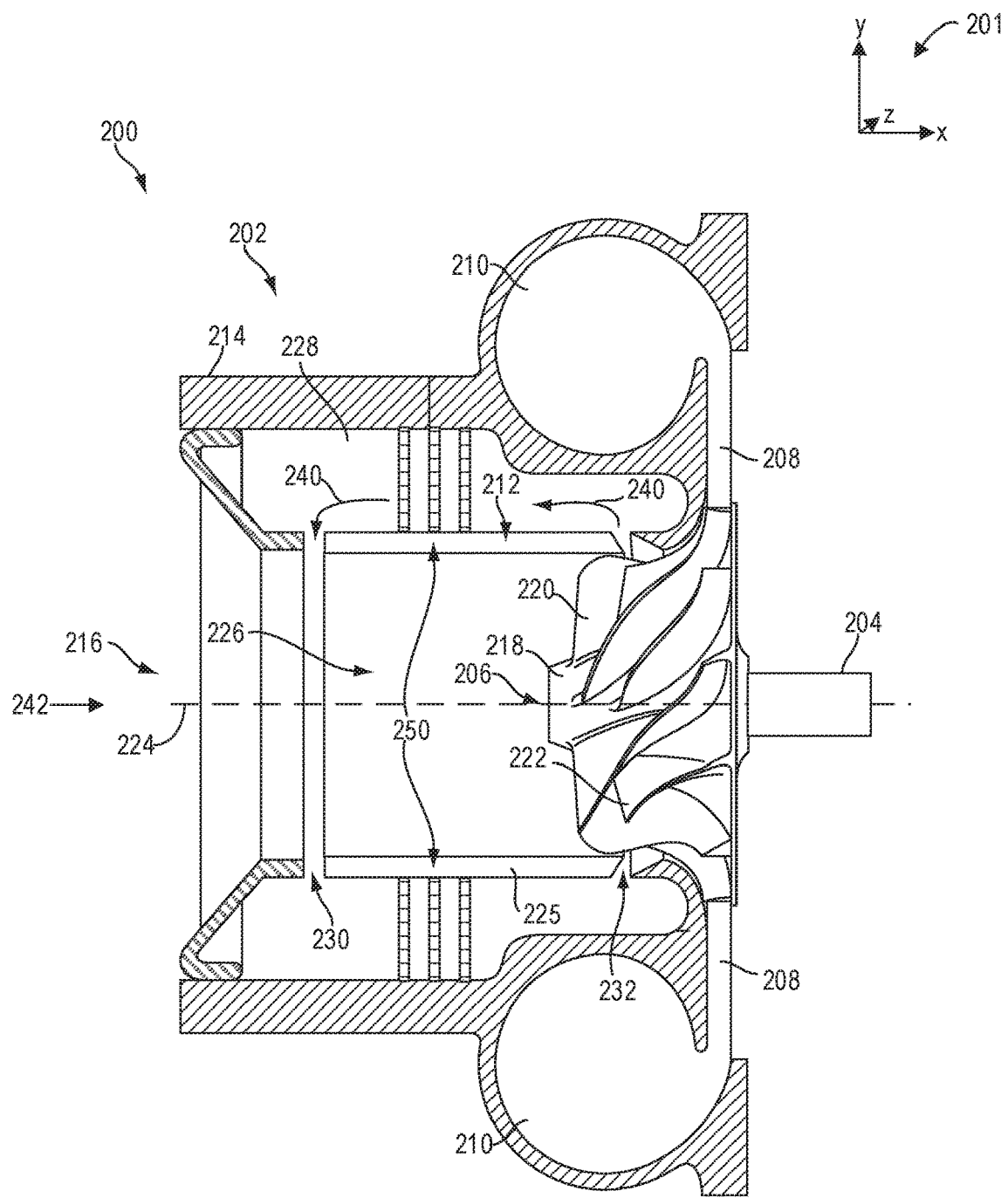
FIG. 2 shows a cut-away view of a first embodiment of a turbocharger compressor adapted with a casing treatment.
Figure 7:
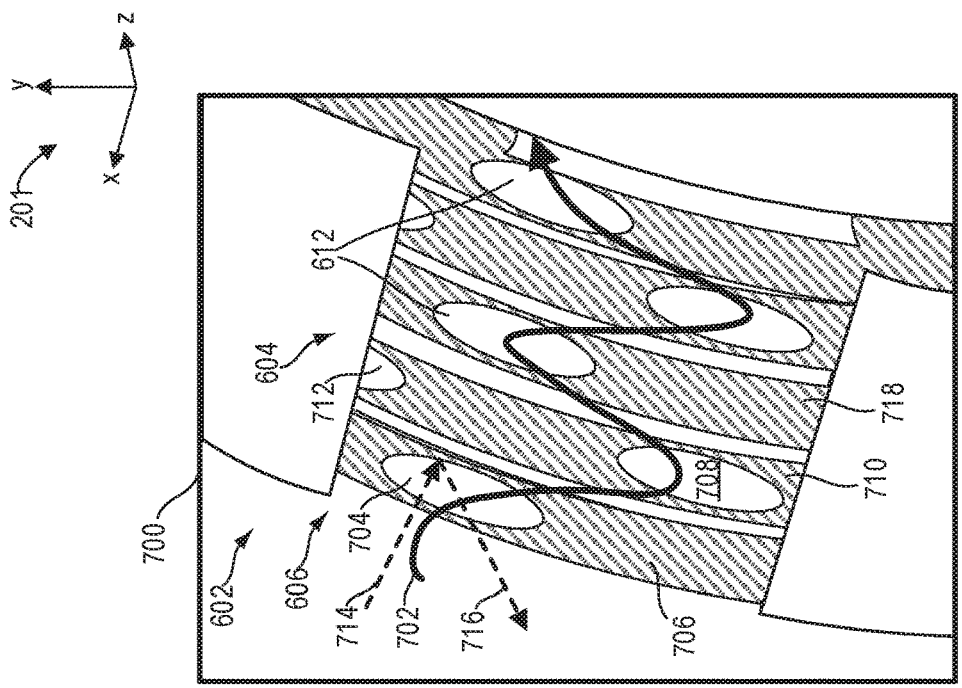
FIG. 7 shows a schematic diagram of the casing treatment with the set of perforated rings of FIG. 5, depicting a path of air flow as well as a path of sound wave travel.

The following description relates to systems and methods for reducing noise produced in a ported shroud or casing treatment of a turbocharger compressor. The turbocharger compressor may be a component in a turbocharger, coupled to a turbine that drives a rotation of the compressor. An example of an engine adapted with the turbocharger is shown in FIG. 1. The compressor of the turbocharger may include the casing treatment, as illustrated in FIG. 2, to increase compressor flow range by providing an additional pathway for air flow through the compressor inlet. The casing treatment may include a bypass, or recirculation passage in an inlet of the compressor that allows compressed air to flow from a bleed slot located on a shroud of an impeller inducer to the inlet of the compressor to mitigate flow separation in the impeller inducer area that may otherwise lead to compressor surge. The recirculation passage may transmit noise generated at a compressor impeller that may be dampened by equipping the recirculation passage with a set of perforated rings, as shown in FIG. 3. A ring of the set of perforated rings is depicted in FIG. 4 to show a placement of apertures around a circumference of the ring. A positioning of the set of perforated rings within the recirculation passage of the compressor is shown from a front view in FIG. 5. The set of perforated rings may fit within the recirculation passage so that air flow is directed exclusively through the apertures of the set of perforated rings. That is to say, the perforated rings are shaped corresponding to a width of the recirculation passage to force gases in the recirculation passage to flow through one or more perforations of the perforated rings before flowing back to the intake passage. The set of perforated rings may comprise variations in a number of rings, such as three rings, as shown in FIG. 3, or five rings, as shown in FIGS. 6 and 7. The rings of the set of perforated rings may be oriented so that the apertures of the rings are offset, forcing air flow to follow a non-linear path, as indicated in FIG. 7.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, an example of a cylinder 14 of an internal combustion engine 10 is illustrated, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel 55 of the passenger vehicle via a transmission 54, as described further below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

The compressor 174 may be adapted with a casing treatment to expand a flow range of the compressor 174, allowing the compressor 174 to operate stably under a greater range of air masses passing through the compressor 174. The casing treatment may include a chamber for air flow that may transmit loud sounds generated in the compressor 174 that may be disruptive to passengers in a cabin of the vehicle 5 or within a proximity of the vehicle 5. A device or system for suppressing noise generated in the casing treatment may be installed in the compressor 174. For example, the device or system may be a set of perforated rings, configured to allow air to pass but deflect sound waves. Details of the casing treatment and the set of perforated rings are described further below, with reference to FIGS. 2-7. As such, the compressor may comprise the set of perforated rings when in a turbocharger and/or supercharger arrangement without departing from the scope of the present disclosure.

A throttle 162 including a throttle plate 164 may be provided in the engine intake passage for varying the flow rate and/or pressure of intake air provided to the engine cylinders. For example, throttle 162 may be positioned downstream of compressor 174, as shown in FIG. 1, or may be alternatively provided upstream of compressor 174.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples the engine may ignite the charge by compression as in a diesel engine.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW-1 received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 148; a profile ignition pickup signal (PIP) from a Hall effect sensor 120 (or other type) coupled to crankshaft 140; throttle position (TP) from a throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold.

Controller 12 receives signals from the various sensors of FIG. 1 and employs the various actuators of FIG. 1 to adjust engine operation based on the received signals and instructions stored on a memory of the controller. For example, upon receiving signals from various sensors, the engine controller may send control signals to an actuator to increase or decrease an opening of an exhaust turbine wastegate controlling flow of exhaust gas to an exhaust turbine. Adjusting an amount of exhaust gas to the exhaust turbine may vary a compressor speed and thereby control an amount of compression provided to intake air delivered to an engine intake. Operation of the actuator to moderate exhaust gas flow to the exhaust turbine may be performed in response to a current engine speed and engine load relative to a surge threshold and/or choke threshold of the compressor.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

FIG. 2 shows a cut-away view 200 of a first embodiment of a compressor 202 of a turbocharger including a casing treatment (CT) positioned in an inlet conduit (e.g., intake passage) of the compressor 202. A set of reference axes 201 are provided for comparison between views, indicating a y-axis, an x-axis, and a z-axis. In one example, compressor 202 may be used similarly to compressor 174 of FIG. 1. A turbine, such as turbine 176 shown in FIG. 1, may be rotationally coupled to compressor 202 via a shaft 204. Specifically, the turbine converts the energy of the exhaust gas into rotational energy for rotating drive shaft 204 connected to impeller 206. Impeller 206 may also be referred to herein as a compressor wheel. In some examples, shaft 204 may be coupled to an electric motor (e.g., electric motor 52 of FIG. 1), the electric motor configured to drive the compressor 202 during some engine operating conditions in a supercharger configuration. Compressor 202 further includes a diffuser 208, a volute (e.g., compressor chamber) 210, a casing treatment 212, and a casing 214. The rotation of impeller 206 draws gas into compressor 202 through compressor inlet 216 of casing 214. As non-limiting examples, the gas may include air from an intake passage, exhaust gas (such as when using long loop EGR and/or low-pressure EGR), gaseous fuel (such as when using port injection of fuel), and combinations thereof. Gas flows from compressor inlet 216 and may be accelerated by impeller 206 through diffuser 208 into volute 210. Diffuser 208 and volute 210 may decelerate the gas causing an increase in pressure in volute 210. Compressed gas may flow from volute 210 to the intake manifold.

Elements in compressor 202 may be described relative to the direction of the gas flow path through compressor 202. An element substantially in the direction of gas flow relative to a reference point is downstream from the reference point. An element substantially opposite the direction of gas flow relative to a reference point is upstream from the reference point. For example, compressor inlet 216 is upstream from impeller 206 which is upstream from diffuser 208. Diffuser 208 is downstream from impeller 206 which is downstream from compressor inlet 216.

Impeller 206 includes hub 218 and a plurality of blades, including a full blade 220 and a splitter blade 222. In some examples, the impeller 206 may have full blade 220 without the splitter blade 222. The full blade 220 and the splitter blade 222 are attached to hub 218. The edge of full blade 220 that is most upstream in compressor 202 may be a leading edge of full blade 220. Similarly, the splitter blade 222 may include a leading edge at the most upstream portion of splitter blade 222. The leading edge of full blade 220 is upstream of the leading edge of the splitter blade 222. Impeller 206 includes an axis of rotation 224 aligned with the axis of rotation for drive shaft 204 and a turbine hub of the turbine. The axis of rotation 224 is substantially parallel with the flow of gas at the compressor inlet 216 and substantially perpendicular to the flow of gas at the diffuser 208. The axis of rotation 224 may also be referred to herein as a central axis of the compressor 202.

Casing 214 includes compressor inlet 216, intake passage (also referred to herein as an inlet conduit) 226, recirculation passage 228, and the casing treatment 212. The casing treatment 212 comprises a recirculation port 230 and a bleed port 232. In some examples, the casing treatment 212 may also include an injection port adjacent to the bleed port 232 and downstream of the bleed port 232. In other examples, the bleed port 232 may be a dual purpose port acting as both the bleed port during low mass flow conditions and the injection port during high mass flow conditions. In yet other examples, casing treatment 212 may be an active casing treatment, configured to alternate between allowing air to flow between intake passage 226 and the recirculation passage 228 either through the bleed port 232 or through the injection port. Impeller 206 is contained in intake passage 226. Bleed port 232 is downstream of the leading edge of full blade 220. Recirculation port 230 is downstream of compressor inlet 216 and upstream of impeller 206. Recirculation port 230 is configured to enable gas to flow between intake passage 226 and recirculation passage 228.

During low mass flow conditions, casing treatment 212 may enable gas to flow from intake passage 226 through bleed port 232 into recirculation passage 228. The gas further continues from recirculation passage 228 through recirculation port 230 into intake passage 226. Thus, the flow of gas striking the leading edge of full blade 220 may be greater than without bleed port 232. The additional flow of gas may enable the compressor 202 to operate with less flow of gas through the compressor before surge occurs, thereby increasing the operating range of the engine and improving engine performance. At high mass flow conditions, casing treatment 212 may enable gas to flow from intake passage 226 through recirculation port 230 into recirculation passage 228 and through bleed port 232 (or the injection port) back into impeller passage. The bypass flow of gas may enable more gas to flow before the turbocharger compressor is in the choke operating condition.

Intake passage 226 may be substantially cylindrical. Recirculation passage 228 may be substantially annular since it is external to intake passage 226. The ports connecting intake passage 226 and recirculation passage 228, such as recirculation port 230 and bleed port 232, may comprise a variety of shapes. For example, the ports may be constructed as one or more holes formed in a wall 225 of (e.g., a wall forming) the intake passage 226. In one example, the wall 225 may be part of the casing treatment 212. As another example, the ports may be constructed as one or more slots extending around the circumference of the intake passage 226 and through the wall 225 of the intake passage 226 or casing treatment 212. The ports may have a uniform or non-uniform width along a length of the port from intake passage 226 to recirculation passage 228. Each port may have a centerline extending along the length of the port from intake passage 226 to recirculation passage 228. The centerline may be normal to the axis of rotation 224 of impeller 206, or the centerline may have a non-zero slope when compared to the normal to the axis of rotation 224 of impeller 206. Said another way, the centerline of one or more of the recirculation port 230 and bleed port 232 may be angled to the central axis 224, wherein the angle of each of the centerlines is less than or equal to 90°.

The ports, e.g., the recirculation port 230 and the bleed port 232, may be circular, extending around a circumference of the wall 225 of the intake passage. The bleed port 232 is positioned downstream of the recirculation port 230, proximate to the impeller 206, while the recirculation port 230 may be positioned adjacent and immediately downstream of an opening of the compressor inlet 216. In one example, the bleed port 232 may be angled relative to the central axis 224 so that the bleed port is not aligned perpendicular to the central axis 224. However, in other examples, both the bleed port 232 and the recirculation port 230 may be perpendicular to the central axis 224 or similarly aligned at an angle to the central axis 224 that is more or less than 90 degrees. Furthermore, a width, defined along the x-axis, of the recirculation port 230 may be similar to or different from a width of the bleed port 232. The widths of the recirculation port 230 and the bleed port 232 may be uniform or non-uniform through a thickness of the wall 225.

In one example, the bleed port 232 may be shaped to receive pressurized air from the impeller 206. In this way, air flowing through the recirculation passage 228 may be higher in pressure than air flowing through the intake passage 226. The high-pressure air may flow through the recirculation port 230 and enter the intake passage 226 at an outer, radial location of the intake passage in a direction angled to the arrow 242, representing the general direction of intake air flow through the intake passage 226. In some examples, the angle of the at least partially compressed high-pressure air flowing through the recirculation port may be 90 degrees, however, other angles may be realized without departing from the scope of the present disclosure.

As described above, air may flow through the recirculation passage 228 in a reverse direction, indicated by arrows 240, relative to flow into the compressor inlet 216, indicated by arrow 242. The flow may be induced by development of a pressure gradient across the compressor 202 with a higher pressure at an outlet of the compressor 202, e.g., in volute 210, than at the compressor inlet 216 as impeller 206 spins. A rotation of the impeller 206 may generate noise, and in particular, blade passing frequency noise that increases in frequency as a rotational velocity of the impeller 206 increases. Sound waves associated with the blade passing frequency noise may propagate through recirculation passage 228, amplifying a loudness of the blade passing frequency noise. That is to say, constructive interference may occur in the recirculation passage 228, wherein the blade passing frequency noise increases.

A transmission of the blade passing frequency noise through the casing treatment 212 of the compressor 202 may be inhibited by arranging a set of perforated rings 250 in the recirculation passage 228 of the casing treatment 212, the set of perforated rings 250 oriented perpendicular to the direction of flow through the recirculation passage 228, as indicated by arrows 240. The set of perforated rings 250 may surround the intake passage 226 but may be isolated from the intake passage 226 by the wall 225. As such, the set of perforated rings 250 may contact air flowing through the recirculation passage 228 but not air flowing into the intake passage 226.

The set of perforated rings 250 may be positioned in the flow of air entering the recirculation passage 228 through the bleed port 232. The air flows from the bleed port 232, through perforations, or apertures, in the set of perforated rings 250 and into the intake passage 226 via the recirculation port 230. The air may be forced to follow a flow path pattern based on an arrangement of the apertures in each ring of the set of perforated rings 250. Further details of the set of perforated rings 250 are depicted in a second embodiment 300 of a compressor 302 in FIG. 3, which may be the compressor 174 of FIG. 1 in some examples, shown from a perspective view.

The compressor 302 of FIG. 3 is oriented opposite of the compressor 202 of FIG. 2 along the x-axis and a portion of an intake passage wall 304 of the compressor 302 is cut away to show an arrangement of a set of perforated rings 306 within a recirculation passage 308 of the compressor 302. A direction of air flow into an intake passage 310 of an inlet 312 of the compressor 302 is indicated by arrow 314. The set of perforated rings 306 may be positioned downstream of the intake passage 310, upstream of an impeller 316 of the compressor 302 and centered about a central axis 318 of the compressor 302.

The set of perforated rings may include a number of individual rings, one of which is shown in FIG. 4. A front view, e.g., viewed from along the x-axis, of a ring 400 is provided in FIG. 4. The ring 400 is annular with an inner diameter 402 and an outer diameter 404 configured to match an inner diameter and an outer diameter of a recirculation passage, e.g., the recirculation passage 308 of FIG. 3. Along the y-z plane, a cross-section of the ring 400 may have an overall annular geometry with a circular outer shape. Along the y-x plane, a cross-section of the ring 400 may have a rectangular shape with a length, along the y-axis, that is much greater than a thickness, defined along the x-axis, of the ring 400. The ring 400 may be adapted with circular openings, or apertures 406 that extend entirely through a thickness, defined along the x-axis, of the ring 400. The apertures 406 may be evenly spaced apart around a circumference of the ring 400. A diameter 408 of the apertures 406 may be smaller than a width 410 of the ring 400, the width 410 defined as half of a difference between the inner diameter 402 and the outer diameter 404 of the ring 400.

The width 410 may be equal or similar to a width of a recirculation passage such as the recirculation passage 308 of FIG. 3 or 228 of FIG. 2. The width of the recirculation passage may be a distance between a wall of the intake passage, such as the wall 225 of FIG. 2, and an inner surface of a compressor casing, e.g., the casing 214 of FIG. 2. The width 410 of the ring 400 may be configured to force air in the recirculation passage to flow through the apertures 406 of the ring 400.

That is to say, the ring 400 may comprise a solid body impervious to gas flow, wherein the width 410 of the body of the ring 400 is substantially equal to a width of the recirculation passage (e.g., recirculation passage 228 of FIG. 2). Gases in the recirculation passage may not flow through the body of the ring 400 or between physical couplings between the body of the ring 400 and surfaces of the recirculation passage. In this way, gases in the recirculation passage may be forced to flow through the one or more apertures 406 arranged along the body of the ring 400.

The apertures 406 of the ring 400 are depicted as all being equal in diameter in FIG. 4. Alternate embodiments of the ring 400, however, may include varying widths of the perforations so that some perforations may be wider in diameter than others. As an example, apertures 406 of a different diameter may be positioned lower relative to the y-axis in the compressor 302 than other apertures 406 to accommodate layering of gas flow according to a density of the air. In some examples, air may be heated unevenly or mixed with other gases, such as fuel vapors, resulting in air masses of differing densities. More dense air or air mixtures may flow at a lower level and lower speed than less dense air or air mixtures, sinking to a lower portion of the recirculation passage 308, with respect to the y-axis, and the apertures 406 may be varied in diameter according to an air flow speed dependent on flow velocity.

Figure 5:
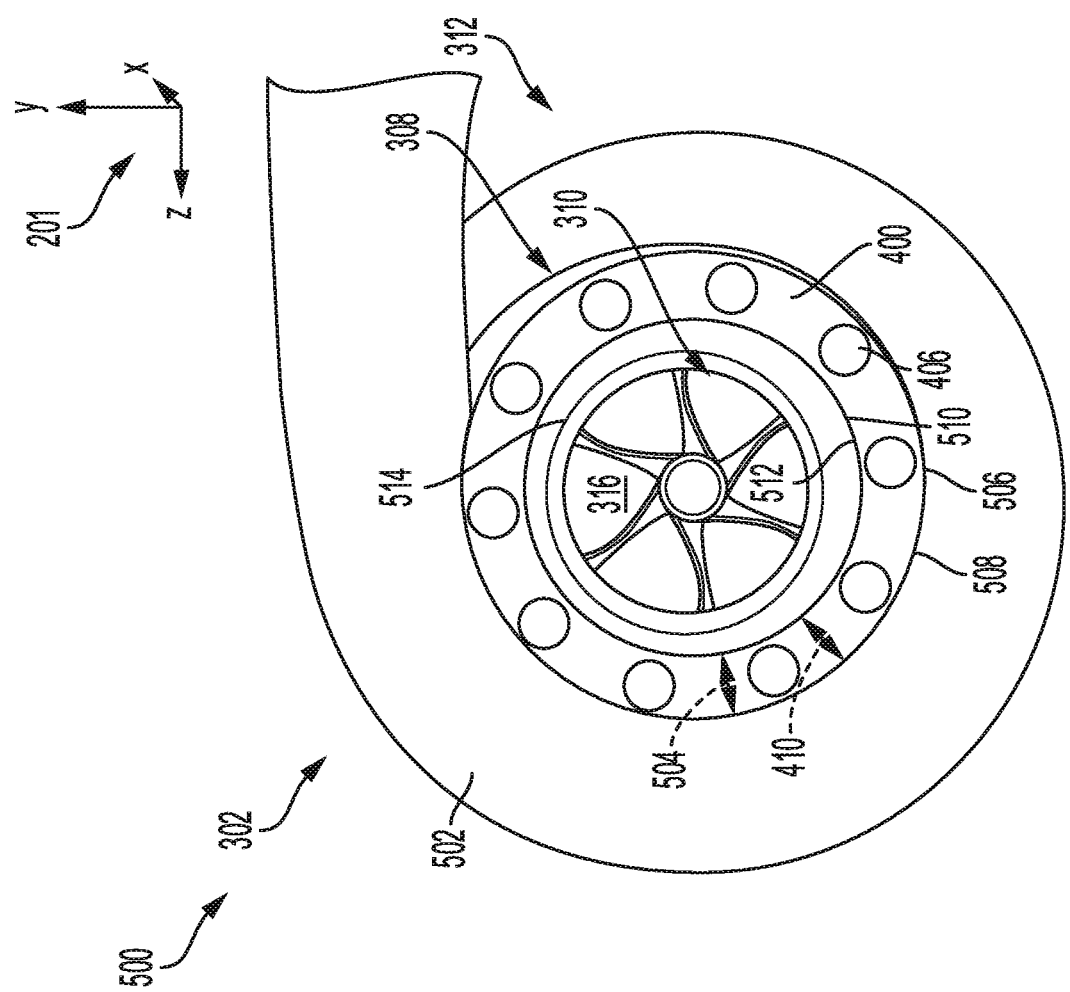
FIG. 5 shows a front view of a third embodiment of the turbocharger compressor with the set of perforated rings installed in a bypass passage of the casing treatment.
Figure 6:
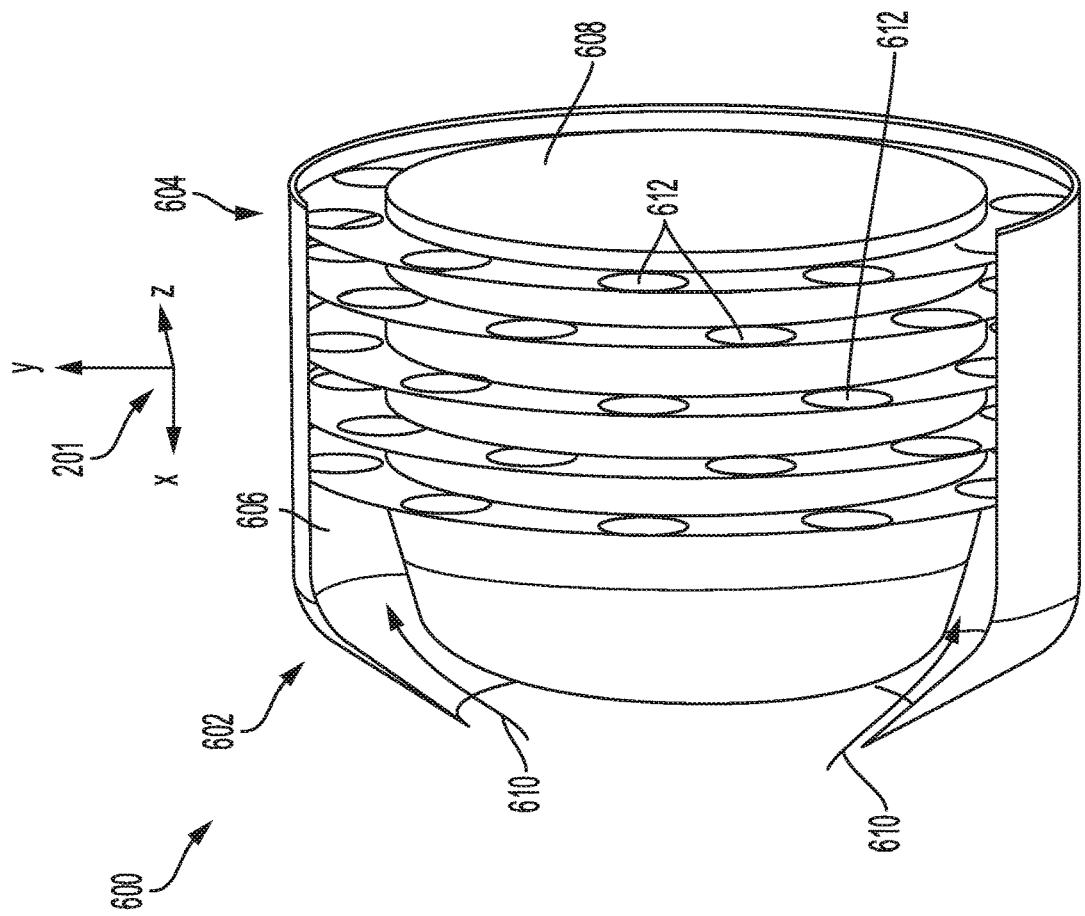
FIG. 6 shows a cut-away view of a turbocharger compressor adapted with a variation in a number of rings of the set of perforated rings.

A placement of the perforated ring 400 in the recirculation passage 308 of the compressor 302 is illustrated in a front view 500 of compressor 302 shown in FIG. 5. The front view 500 shows the compressor inlet 312 as viewed along the x-axis from the compressor inlet 312 towards the impeller 316. A volute 502 surrounds the impeller 316. The recirculation passage 308 may be an annular chamber that surrounds the intake passage 310.

The ring 400 may be positioned in the recirculation passage 308 so that a plane of the ring 400 is perpendicular to a direction of flow into the intake passage 310 (e.g., into the page) and through the recirculation passage 308 (e.g., out of the page). The width 410 of the ring 400 may be similar or slightly narrower than a width 504 of the recirculation passage 308. The ring 400 may be secured in place in the recirculation passage 308 by friction between an outer edge 506 of the ring 400 and an inner wall 508 of a compressor casing and between an inner edge 510 of the ring 400 and an outer surface 512 of a wall 514 of the intake passage 310. In some examples, the ring may be arranged in the recirculation passage via one or more of adhesives, fasteners, welds, and fusions.

Returning to FIG. 3, the set of perforated rings 306 may include three rings, each of which may be the ring 400 of FIG. 4, arranged as cascaded layers in the direction of flow, as indicated by arrow 314. In one example, the set of perforated rings 306 are cascaded in a direction of gas flow through the recirculation passage. A first ring 320 may be a most upstream ring (e.g., when gases are flowing in a direction from the impeller 316 towards the compressor inlet 312) of the set of perforated rings 306, a second ring 322 may be downstream of the first ring 320 and upstream of a third ring 324. Each ring may be adapted with apertures 326 that are through-holes, extending through a thickness, measured along the x-axis, of each ring. The apertures 326 allow air to pass through the recirculation passage 308, in spite of the positioning of the set of perforated rings 306 in the path of air flow. An orientation of the set of perforated rings 306, with regards to how the apertures of each ring of the set of perforated rings 306 are aligned, may determine a geometry of the flow path through the recirculation passage 308. For example, the apertures 326 of the first ring 320 and of the third ring 324 are aligned along the x-axis in FIG. 3. The second ring 322, however, is arranged so that the apertures 326 of the second ring 322 are offset from the apertures 326 of the first and third rings 320, 324. The apertures 326 of the second ring 322 are instead aligned with solid surfaces of the first and third rings 320, 324, the solid surfaces disposed between the apertures 326 of each ring. The alignment of the apertures 326 in the set of perforated rings 306, in addition to directing the path of air flow, may also regulate transmission of sound waves from the impeller 316, as described further below with reference to FIG. 7.

A number of rings in the set of perforated rings may vary between two to eight rings. As one example, the compressor 302 of FIG. 3 includes three rings and in another example, a cutaway view 600 of a compressor inlet 602, which may be the compressor inlet 216 of FIG. 2, shown in FIG. 6 illustrates a set of perforated rings 604 comprising five rings. The rings of the set of perforated rings 604 may be layered within a recirculation passage 606 of the compressor inlet 602 surrounding an intake passage 608, each ring evenly spaced apart from one or more adjacent rings in a direction of flow through the recirculation passage 606, as indicated by arrows 610.

Each ring in the set of perforated rings 604 may be adapted with apertures 612 spaced evenly apart around a circumference of each ring, as described above with reference to FIG. 4. The rings of the set of perforated rings 604 may be arranged so that apertures 612 of one ring are offset from apertures 612 of adjacent rings, as described above with reference to FIG. 3. Thus apertures 612 of every other ring in the set of perforated rings 604 may be aligned, forcing air flow through the recirculation passage 606 to follow a non-linear, torturous path.

The flow path is illustrated in an expanded view 700 of the compressor inlet 602 in FIG. 7. A path of air flow through the apertures 612 of the set of perforated rings 604 is indicated by an arrow 702. Arrow 702 has a sinuous shape, passing through one of the apertures 612 in each ring of the set of perforated rings 604. For example, air may flow through a first aperture 704 of a first ring 706 and continue from the first aperture 704 to a second aperture 708 of a second ring 710. The second aperture 708 may be an aperture in the second ring 710 that is most closely aligned with the first aperture 704 of the first ring 706. Alternatively, a portion of the air flow may also travel through a third aperture 712 in the second ring 710 that may be similarly offset from the first aperture 704 of the first ring 706 as the second aperture 708, but positioned above the first aperture 704, with respect to the y-axis, instead of below. Thus air flow through the recirculation passage 606 may follow multiple paths but all paths may force the air to turn and flow along a twisting pattern.

A sound wave, generated at an impeller of the compressor, may also pass through the first aperture 704 of the first ring 706, following a path indicated by arrow 714. In one example, the first aperture 704 may be used similarly to one of the apertures 326 of the first ring 320 of FIG. 3. The sound wave may be constrained to a linear path and, upon passing through the first aperture 704, may collide with a surface of the second ring 710. The collision may result in deflection of the sound wave in a direction indicated by arrow 716, towards the impeller. The path of the sound wave indicated by arrows 714 and 716 may not be consistent amongst all sound waves generated in the compressor, however. A plurality of sound waves of varying frequencies may be produced in the compressor, resulting in deflection of the sound waves at a range of angles, both smaller and larger relative to the y-axis than a deflection angle of the sound wave indicated in FIG. 7 by arrow 716. As such, a portion of the sound waves may be deflected so that the sound waves may pass through one of the apertures 612 of the second ring 710. The sounds waves that pass through the apertures 612 of the second ring 710 may collide with surfaces of a third ring 718 of the set of perforated rings 604, the third ring 718 adjacent to the second ring 710 and on an opposite side of the second ring 710 from the first ring 706. In one example, sound waves may follow a sinusoidal flow path or other more convoluted flow path. For example, sound waves flowing through the first ring 706 may flow around an entire circumference of the recirculation passage before flowing through a perforation of the second ring. Additionally or alternatively, sound waves may flow around only a portion of the circumference of the recirculation passage before flowing through a perforation of the second ring.

In one example, a number of rings in the set of perforated rings may be varied depending on an amount of air flowing through the recirculation passage. The amount of air flow may be modified base on, for example, an inner volume of the recirculation passage. If the inner volume of the recirculation passage is increased, either by widening or lengthening the recirculation, more air may flow through the recirculation passage and the number of rings may be increased to maintain a rate of flow through the recirculation passage. Similarly, if the inner volume of the recirculation passage is decreased, the number rings in the set of perforated rings may be reduced.

In another example, the number of rings in the set of perforated rings may be varied based on a size of the impeller. A larger impeller may generate louder noise. An increased dampening effect of the set of perforated rings may be enabled by increasing the number of rings, thereby increasing a likelihood of collisions between sound waves and surfaces of the rings. However, air flow through the recirculation passage may be affected by the size of the impeller, resulting in a change in a surge margin of the compressor. The number of rings in set of perforated rings may be adjusted accordingly to maintain stable operation of the compressor while reducing blade pass frequency noise.

For example, a first recirculation passage surrounding an intake passage adapted with two perforated rings may generate a first level of noise and a first flow velocity through the first recirculation passage when a compressor is operating and air is channeled through the first recirculation passage. A second recirculation passage of a same set of dimensions as the first recirculation passage, also configured to guide air flow around an intake passage of a compressor, but configured with eight perforated rings may generate a second level of noise that is lower than the first level of noise transmitted through the first recirculation passage. A second flow velocity through the second recirculation, however, may also be lower than the flow velocity through the first recirculation passage.

Thus by increasing a number of rings in the set of perforated rings, a portion of sound waves that is transmitted through the recirculation passage is reduced. As an example, a set of perforated rings with two rings may suppress a fraction of noise generated by the impeller, such as 10%, while a set of perforated rings with 8 rings may dampen the noise by 50%. Increasing the number of rings may impose flow restriction in the recirculation passage, forcing the air to follow a path with increased turns and slowing air flow velocity. Thus, in one example, configuring the recirculation passage with five perforated rings may provide a desirable level of noise suppression along with minimal restriction of air flow. By installing five perforated rings in the recirculation passage, blade pass frequency noise emanating from the compressor may be reduced by 28 dB from 150 dB. A wide flow range of the compressor may be maintained while reducing undesirable sound generated during compressor operation.

In this way, a turbocharger compressor may be adapted with a set of perforated rings, arranged in a recirculation passage of a casing treatment of the compressor. The set of perforated rings may include two or more rings, each ring having apertures evenly spaced around a circumference of the ring and extending entirely through a thickness of the ring. The set of perforated rings may be arranged so that apertures of one ring are offset from apertures of immediately adjacent rings, forcing air flow through the apertures to follow a nonlinear, torturous path. The offset positioning of the apertures of the set of perforated rings increases a probability that sound waves, generated by a compressor impeller and constrained to a linear path of travel, may collide with surfaces of the set of perforated rings. Collisions with surfaces of the set of perforated rings may deflect at least a portion of the sound waves away from a direction of air flow through the recirculation passage, reducing noise propagation through the recirculation passage. Increasing a number of rings in the set of perforated rings may increase a noise dampening effect of the set of perforated rings by increasing a likelihood that sound waves are deflected away from a path of air flow through the recirculation passage.

The technical effect of installing a set of perforated rings in the recirculation passage of a casing treatment of a compressor is that a flow range of the compressor is maintained while propagation of noise generated at a compressor impeller is suppressed.

In one embodiment, a noise mitigating device includes a plurality of perforated rings cascaded along a recirculation passage arranged outside of an intake passage within a compressor housing. In a first example of the device, the intake passage is shaped to direct intake gases along a central axis of the compressor housing to a compressor impeller. A second example of the device optionally includes the first example, and further includes wherein the recirculation passage is fluidly coupled to the intake passage via a bleed port and a recirculation port, the bleed port arranged upstream of each of the plurality of perforated rings and the recirculation port, and wherein the recirculation port is arranged downstream of the plurality of perforated rings. A third example of the device optionally includes one or more of the first and second examples, and further includes, wherein each ring of the plurality of perforated rings are identical. A fourth example of the device optionally includes one or more of the first through third examples, and further includes, wherein each ring of the plurality of perforated rings is misaligned with adjacent rings of the plurality of perforated rings to force gas in the recirculation passage to deviate from a linear flow path as the gas flows from a perforation of an upstream ring to a perforation of a downstream ring. A fifth example of the device optionally includes one or more of the first through fourth examples, and further includes, wherein a width of each ring of the plurality of perforated rings is equal to a width of the recirculation passage, and wherein there are no additional inlet or outlets of the plurality of perforated rings other than the perforations of each ring. A sixth example of the device optionally includes one or more of the first through fifth examples, and further includes, wherein the perforations of each ring of the plurality of perforated rings are separated by solid surfaces of the ring impervious to gas flow. A seventh example of the device optionally includes one or more of the first through sixth examples, and further includes, wherein sound waves, generated at a compressor impeller, travel through the recirculation passage along a linear path and collide with the solid surfaces of plurality of perforated rings.

In another embodiment, a system includes a compressor arranged in a compressor housing an intake passage shaped to flow air to an impeller of the compressor and to a recirculation passage arranged radially outside of the intake passage in the compressor housing, and at least two perforated rings arranged between an inlet and an outlet of the recirculation passage. In a first example of the system the at least two perforated rings are shaped to force gases in the recirculation passage to flow through apertures of the at least two perforated rings before flowing through the outlet of the recirculation passage to the intake passage. A second example of the system optionally includes the first example, and further includes wherein the apertures of the at least two perforated rings are equal in diameter and spaced evenly apart around a circumference of each ring of the at least two perforated rings. A third example of the system optionally includes one or more of the first and second examples, and further includes, wherein the at least two perforated rings are arranged concentrically around a central axis of the compressor and oriented so that the apertures of the at least two perforated rings are misaligned. A fourth example of the system optionally includes one or more of the first through third examples, and further includes, wherein the apertures of the at least two perforated rings extend entirely through a thickness of each ring of the perforated rings, the thickness defined along the central axis of the compressor. A fifth example of the system optionally includes one or more of the first through fourth examples, and further includes, wherein the at least two perforated rings are positioned in the recirculation passage so that solid surfaces of each ring of the at least two perforated rings, the solid surfaces disposed between the apertures of each ring, are aligned perpendicular to both the central axis and a direction of gas flow through the recirculation passage. A sixth example of the system optionally includes one or more of the first through fifth examples, and further includes, wherein the at least two perforated rings are spaced apart from each other so that air flowing through the recirculation passage travels a distance between each ring of the at least two perforated rings. A seventh example of the system optionally includes one or more of the first through sixth examples, and further includes, wherein sound waves, generated at a blade pass frequency of the impeller, are deflected at the solid surfaces of the at least two perforated rings.

In another embodiment, a compressor includes a casing treatment surrounding an intake passage of the compressor, the casing treatment shaped to flow air around and outside of the intake passage, and a set of perforated rings, arranged in the casing treatment in a path of air flow and cascaded in a direction of air flow outside of the intake passage. In a first example of the compressor, the set of perforated rings forces air to follow a non-linear path through the casing treatment while deflecting at least a portion of sound waves generated in the compressor. A second example of the compressor optionally includes the first example, and further includes wherein each ring of the set of perforated rings comprises a body impervious to gas flow, and where each ring of the set of perforated rings comprises a plurality of perforations arranged along the body, and where air flows through only the plurality of perforations. A third example of the compressor optionally includes one or more of the first and second examples, and further includes, wherein the set of perforated rings are sandwiched between surfaces of the casing treatment shaping the recirculation passage and a portion of the intake passage interior to the casing treatment.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A noise mitigating device comprising:
a plurality of rings cascaded along a recirculation passage arranged outside of an intake passage within a compressor housing, wherein each ring of the plurality of rings includes a respective plurality of perforations, with each perforation of the respective plurality of perforations spaced evenly apart from each adjacent perforation of the respective plurality of perforations around a ring circumference, and wherein each perforation of the respective plurality of perforations of each ring of the plurality of rings is aligned with a respective solid surface of each adjacent ring of the plurality of rings in a direction of a central axis of the compressor housing.

2. The noise mitigating device of claim 1, wherein the intake passage is shaped to direct intake gases along the central axis of the compressor housing to a compressor impeller.

3. The noise mitigating device of claim 1, wherein the recirculation passage is fluidly coupled to the intake passage via a bleed port and a recirculation port, the plurality of rings arranged between the recirculation port and the bleed port.

4. The noise mitigating device of claim 1, wherein each ring of the plurality of rings is identical.

5. The noise mitigating device of claim 4, wherein each ring of the plurality of rings is misaligned along an axial direction with adjacent rings of the plurality of rings to force gas in the recirculation passage to deviate from a linear flow path as the gas flows from a perforation of a first ring of the plurality of rings to a perforation of a second ring of the plurality of rings.

6. The noise mitigating device of claim 5, wherein a width of each ring of the plurality of rings is equal to a width of the recirculation passage, and wherein there are no additional inlet or outlets of the plurality of rings other than the respective plurality of perforations of each ring.

7. The noise mitigating device of claim 6, wherein, for each ring of the plurality of rings, each perforation of the respective plurality of perforations is separated from each adjacent perforation of the respective plurality of perforations by solid surfaces of the ring impervious to gas flow.

8. The noise mitigating device of claim 7, wherein the compressor housing is shaped to direct sound waves generated at a compressor impeller, travel through the recirculation passage along a linear path intercepted by the solid surfaces.

9. A system comprising;
a compressor arranged in a compressor housing;
an intake passage shaped to flow air to an impeller of the compressor and to a recirculation passage arranged radially outside of the intake passage in the compressor housing; and
at least two perforated rings arranged between an inlet and an outlet of the recirculation passage, where each perforated ring of the at least two perforated rings includes a plurality of apertures, with each aperture of each perforated ring spaced apart from each adjacent aperture around a circumference of each perforated ring, and where each aperture of each perforated ring is aligned with solid surfaces of each adjacent perforated ring in an axial direction of the compressor.

10. The system of claim 9, wherein the at least two perforated rings are shaped to force gases in the recirculation passage to flow through the plurality of apertures of each perforated ring of at least two perforated rings before flowing through the outlet of the recirculation passage to the intake passage.

11. The system of claim 10, wherein each aperture of the plurality of apertures of each of the at least two perforated rings is equal in diameter.

12. The system of claim 11, wherein the at least two perforated rings are arranged concentrically around a central axis of the compressor and oriented so that the plurality of apertures of each perforated ring of the at least two perforated rings is misaligned with the plurality of apertures of each adjacent perforated ring of the at least two perforated rings.

13. The system of claim 12, wherein each aperture of the plurality of apertures of each perforated ring of the at least two perforated rings extends entirely through a thickness of each perforated ring, the thickness defined along the central axis of the compressor.

14. The system of claim 13, wherein the at least two perforated rings are positioned in the recirculation passage so that the solid surfaces of each perforated ring of the at least two perforated rings, the solid surfaces disposed between the apertures of each perforated ring, are aligned perpendicular to both the central axis and a direction of gas flow through the recirculation passage.

15. The system of claim 14, wherein each perforated ring of the at least two perforated rings is spaced apart from each other adjacent perforated ring of the at least two perforated rings so that air flowing through the recirculation passage travels a distance between each perforated ring of the at least two perforated rings and each adjacent perforated ring of the at least two perforated rings.

16. The system of claim 15, wherein the plurality of perforated rings is arranged to deflect sound waves, generated at a blade pass frequency of the impeller.

17. A compressor comprising;
a casing treatment surrounding an intake passage of the compressor, the casing treatment shaped to flow air around and outside of the intake passage; and
a set of perforated rings, arranged in the casing treatment in a path of air flow and cascaded in a direction of air flow outside of the intake passage, where each ring of the set of perforated rings includes a plurality of perforations spaced evenly around a circumference of a body of each ring, with the plurality of perforations of each ring of the set of perforated rings being misaligned with the plurality of perforations of each adjacent ring of the set of perforated rings to force the air flow through all perforations of the plurality of perforations to a tortuous path.

18. The compressor of claim 17, wherein the set of perforated rings forces air flow to the tortuous path through the casing treatment while deflecting at least a portion of sound waves generated in the compressor.

19. The compressor of claim 17, wherein the body of each ring of the set of perforated rings is impervious to gas flow except at each perforation of the plurality of perforations.

20. The compressor of claim 17, wherein the set of perforated rings are sandwiched between surfaces of the casing treatment shaping a recirculation passage and a portion of the intake passage interior to the casing treatment.

* * * * *